United States Patent
Favalli et al.

(10) Patent No.: US 12,358,334 B2
(45) Date of Patent: Jul. 15, 2025

(54) METHOD TO CONTROL AN ACTIVE SHOCK ABSORBER OF A ROAD VEHICLE

(71) Applicant: FERRARI S.P.A., Modena (IT)

(72) Inventors: Federico Favalli, Modena (IT); Alessandro Flumeri, Modena (IT); Francesca Mincigrucci, Modena (IT); Stefano Varisco, Modena (IT)

(73) Assignee: FERRARI S.P.A., Modena (IT)

( * ) Notice: Subject to any disclaimer, the term of this patent is extended or adjusted under 35 U.S.C. 154(b) by 218 days.

(21) Appl. No.: 18/297,947

(22) Filed: Apr. 10, 2023

(65) Prior Publication Data

US 2023/0331055 A1 Oct. 19, 2023

(30) Foreign Application Priority Data

Apr. 14, 2022 (IT) .................. 102022000007496

(51) Int. Cl.
*B60G 17/018* (2006.01)
*B60G 17/015* (2006.01)
*B60G 17/019* (2006.01)

(52) U.S. Cl.
CPC ..... *B60G 17/0182* (2013.01); *B60G 17/0152* (2013.01); *B60G 17/019* (2013.01);
(Continued)

(58) Field of Classification Search
CPC .............. B60G 17/0152; B60G 17/018; B60G 17/0182; B60G 17/019; B60G 2202/42;
(Continued)

(56) References Cited

U.S. PATENT DOCUMENTS 5,129,488 A * 7/1992 Furuya .................. F16F 9/5126
188/317
10,106,009 B2 * 10/2018 Hirao ..................... B60G 17/08
(Continued)

FOREIGN PATENT DOCUMENTS

WO WO-2014145215 A2 * 9/2014 ......... B60G 17/0157

OTHER PUBLICATIONS

Italian Search Report for Application No. 102022000007496; Filing Date: Apr. 14, 2022; Date of Mailing—Nov. 18, 2022, 8 pages.

*Primary Examiner* — Mark L. Greene
(74) *Attorney, Agent, or Firm* — CANTOR COLBURN LLP

(57) ABSTRACT

A method to control an active shock absorber of a road vehicle. The active shock absorber is part of a suspension connecting a frame of the road vehicle to a hub of a wheel and has: a first element, which defines an end of the active shock absorber, a second element, which defines another end of the active shock absorber and is mounted so as to slide relative to the first element; and an actuator, which is configured to generate a force, which is applied between the two elements. The control method comprises the steps of: determining a vertical acceleration of the hub; determining a speed of translation between the two elements of the active shock absorber; determining a target force for the actuator of the active shock absorber based on the vertical acceleration of the hub and based on the speed of translation between the two elements of the active shock absorber; and controlling the actuator (10) of the active shock absorber so as to pursue the target force.

15 Claims, 4 Drawing Sheets

(52) U.S. Cl.
CPC .... *B60G 2202/42* (2013.01); *B60G 2400/102* (2013.01); *B60G 2400/202* (2013.01); *B60G 2400/252* (2013.01); *B60G 2500/10* (2013.01); *B60G 2600/182* (2013.01); *B60G 2600/70* (2013.01)

(58) Field of Classification Search
CPC ........ B60G 2400/102; B60G 2400/202; B60G 2400/252; B60G 2500/10; B60G 2600/192; B60G 2600/70
See application file for complete search history.

(56) References Cited

U.S. PATENT DOCUMENTS

| | | | |
|---|---|---|---|
| 10,647,172 B2* | 5/2020 | Ohno | B60G 17/017 |
| 11,299,001 B2* | 4/2022 | Ohno | B60G 17/0162 |
| 2008/0190104 A1* | 8/2008 | Bresie | F15B 7/006 |
| | | | 60/476 |
| 2018/0134111 A1 | 5/2018 | Toyohira et al. | |

* cited by examiner

METHOD TO CONTROL AN ACTIVE SHOCK ABSORBER OF A ROAD VEHICLE

CROSS-REFERENCE TO RELATED APPLICATIONS

This patent application claims priority from Italian patent application no. 102022000007496 filed on Apr. 14, 2022, the entire disclosure of which is incorporated herein by reference.

TECHNICAL FIELD

The invention relates to a method to control an active shock absorber of a road vehicle.

PRIOR ART

The movement of passive shock absorbers is entirely determined by the stresses transmitted by the road surface and, therefore, passive shock absorbers are "at the mercy" of the road surface. For a few years now, active shock absorbers have been offered, which are capable of making autonomous movements (namely, completely independent of the stresses transmitted by the road surface), which are added to the movements caused by the stresses transmitted by the road surface; the aim of the autonomous movements made by an active shock absorber is that of reacting to the stresses transmitted by the road surface so as to maximize the dynamic performance of the road vehicle or improve the driving comfort of the road vehicle (the same road vehicle can have its active shock absorbers pursue different targets depending on the type of driving chosen by the driver).

An active shock absorber is provided with a hydraulic or electric shock absorber of its own, which can be controlled so as to generate an autonomous movement (namely, completely independent of the stresses transmitted by the road surface).

Patent application US2018134111A1 discloses a method to control the active shock absorbers of a car.

DESCRIPTION OF THE INVENTION

The object of the invention is to provide a method to control an active shock absorber of a road vehicle, which is capable of optimizing the damping response.

According to the invention, there is provided a method to control an active shock absorber of a road vehicle according to the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
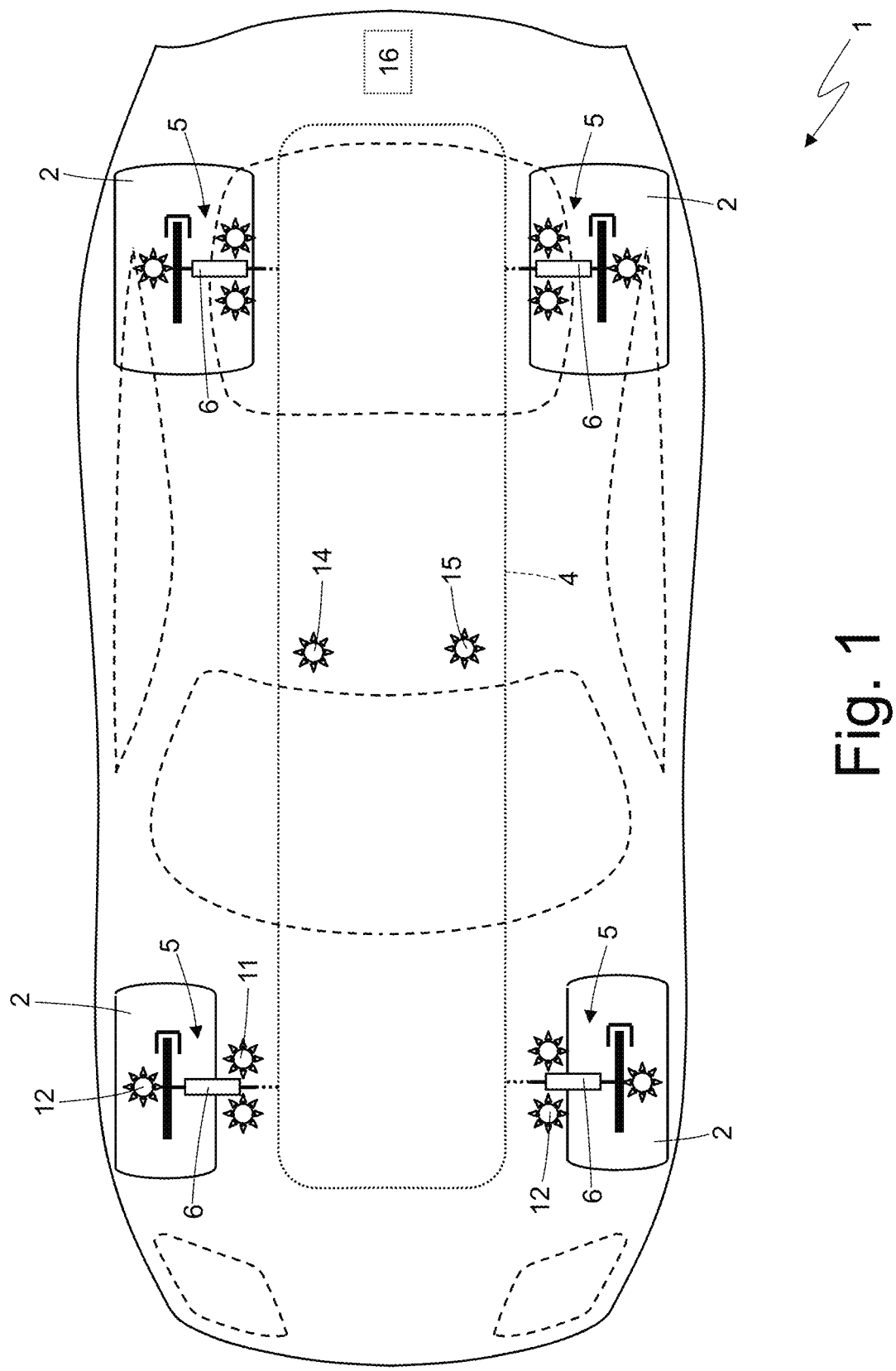
FIG. 1 is a schematic plan view of a road vehicle provided with four active shock absorbers, which are controlled according to the invention.

In FIG. 1, reference number 1 indicates, as a whole, a road vehicle provided with two front wheels 2 and with two rear wheels 2.

The road vehicle 1 is provided with a powertrain system (which is known and is not shown herein), which can comprise an internal combustion engine and/or one or more electric motors and can transmit a motion to the front wheels 2 and/or to the rear wheels 2.

A hub 3 (schematically shown in FIG. 2) of each wheel 2 is connected to a frame 4 of the road vehicle 1 by means of a suspension 5 (partially shown in FIG. 1), which is provided with an (electronically controlled) active shock absorber 6, which is capable of making autonomous movements (namely, completely independent of the stresses transmitted by the road surface), which are added to the movements caused by the stresses transmitted by the road surface.

Figure 2:
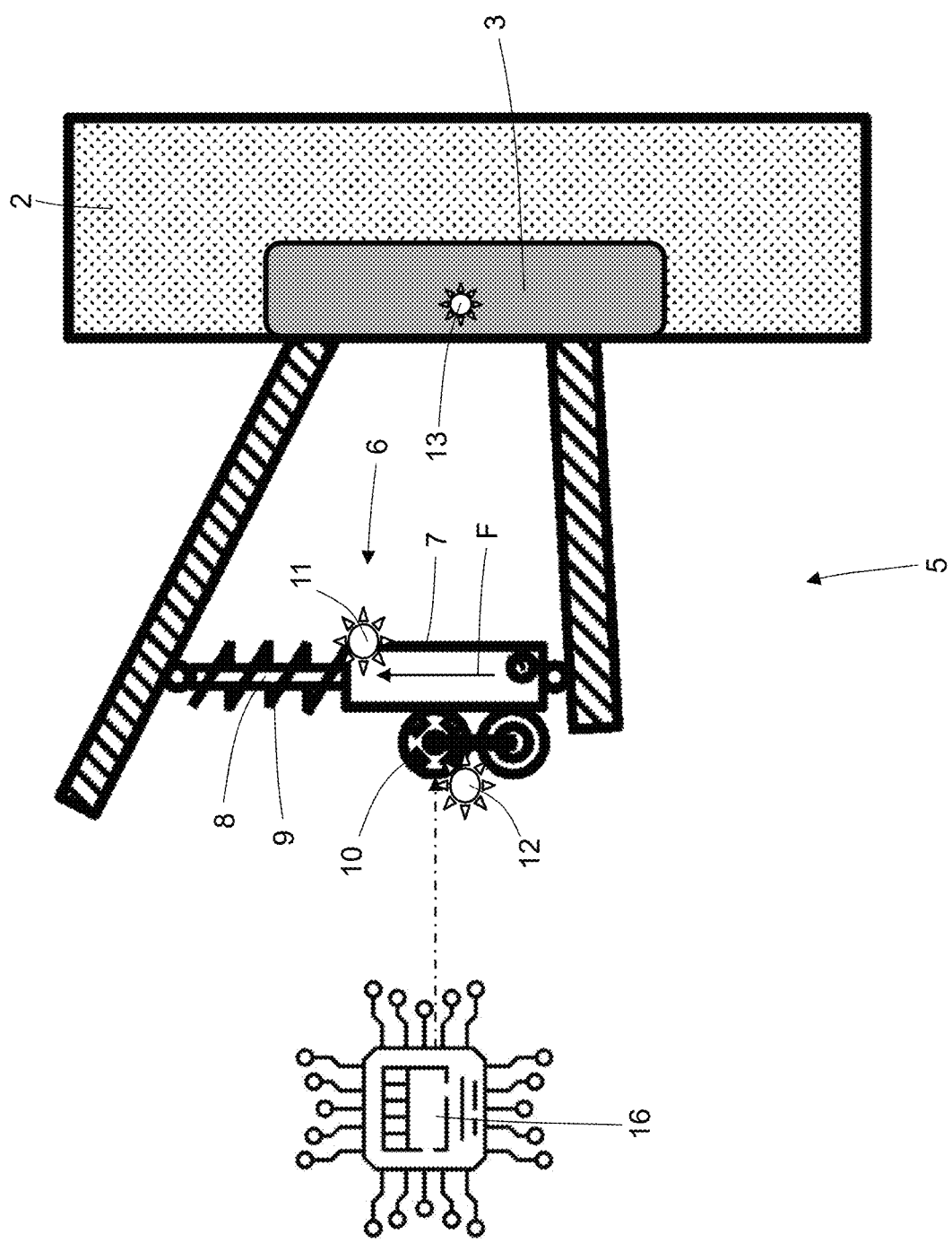
FIG. 2 is a schematic view of a suspension of the road vehicle of FIG. 1.

According to FIG. 2, each active shock absorber 6 comprises an element 7, which defines an end of the active shock absorber 6, and an element 8, which defines the other end of the active shock absorber 6 and is mounted so as to slide relative to the element 7 in order to be able to linearly translate relative to the element 7. Each active shock absorber 6 comprises a spring 9, which is connected between the two elements 7 and 8 and is compressed or expanded when the two elements 7 and 8 linearly translate relative to one another. Finally, each active shock absorber 6 comprises an electric actuator 10 (typically, a rotary electric motor), which is configured to have the active shock absorber 6 make autonomous movements (namely, completely independent of the stresses transmitted by the road surface) between the elements 7 and 8, namely is capable of generating a force F, which is applied between the elements 7 and 8. By way of example, the active shock absorbers 6 could be of the type described in patent applications US2008190104A1 and WO2014145215A2.

Each active shock absorber 6 comprises a position sensor 11 (for example, a potentiometer), which provides the relative position p of the two elements 7 and 8, namely the exact measure of how much the element 8 is translated relative to the element 7. Furthermore, each active shock absorber 6 comprises a position sensor 11 (for example, a rotary encoder), which provides the angular position α of the electric actuator 10. The road vehicle 1 comprises four vertical accelerometers 13, which are mounted on the hubs 3 of the wheels 2, namely are rigidly fixed to the hubs 3 of the wheels 2 in order to move with the hubs 3 of the wheels 2 in an integral manner. Each vertical accelerometer 13 is configured to measure a vertical acceleration $a_z$ of the corresponding hub 3.

According to FIG. 1, the road vehicle 1 comprises a longitudinal accelerometer 14 and a transverse accelerometer 15, which are mounted on the frame 4, namely are rigidly fixed to the frame 4 in order to move with the frame in an integral manner 4, and are configured to measure a longitudinal acceleration $a_x$ and a transverse acceleration $a_y$ of the frame 4 (namely, of the road vehicle 1), respectively. According to a possible embodiment, the two accelerometers 14 and 15 could be integrated in one single sensor (for example, a triple-axis accelerometer), which provides both the longitudinal acceleration $a_x$ and the transverse acceleration $a_y$.

The road vehicle 1 comprises an electronic control unit ("ECU") 16, which, among other things, controls the actuators 10 of the active shock absorbers 6 in the ways described below; from a physical point of view, the control unit 16 can consist of one single device or of several devices, which are separate from one another and communicate through the CAN network of the road vehicle 1. The control unit 16 is connected (directly or indirectly through a BUS network of the road vehicle 1) to the position sensors 11 and 12 and to the accelerometers 13, 14 and 15.

Figure 3:
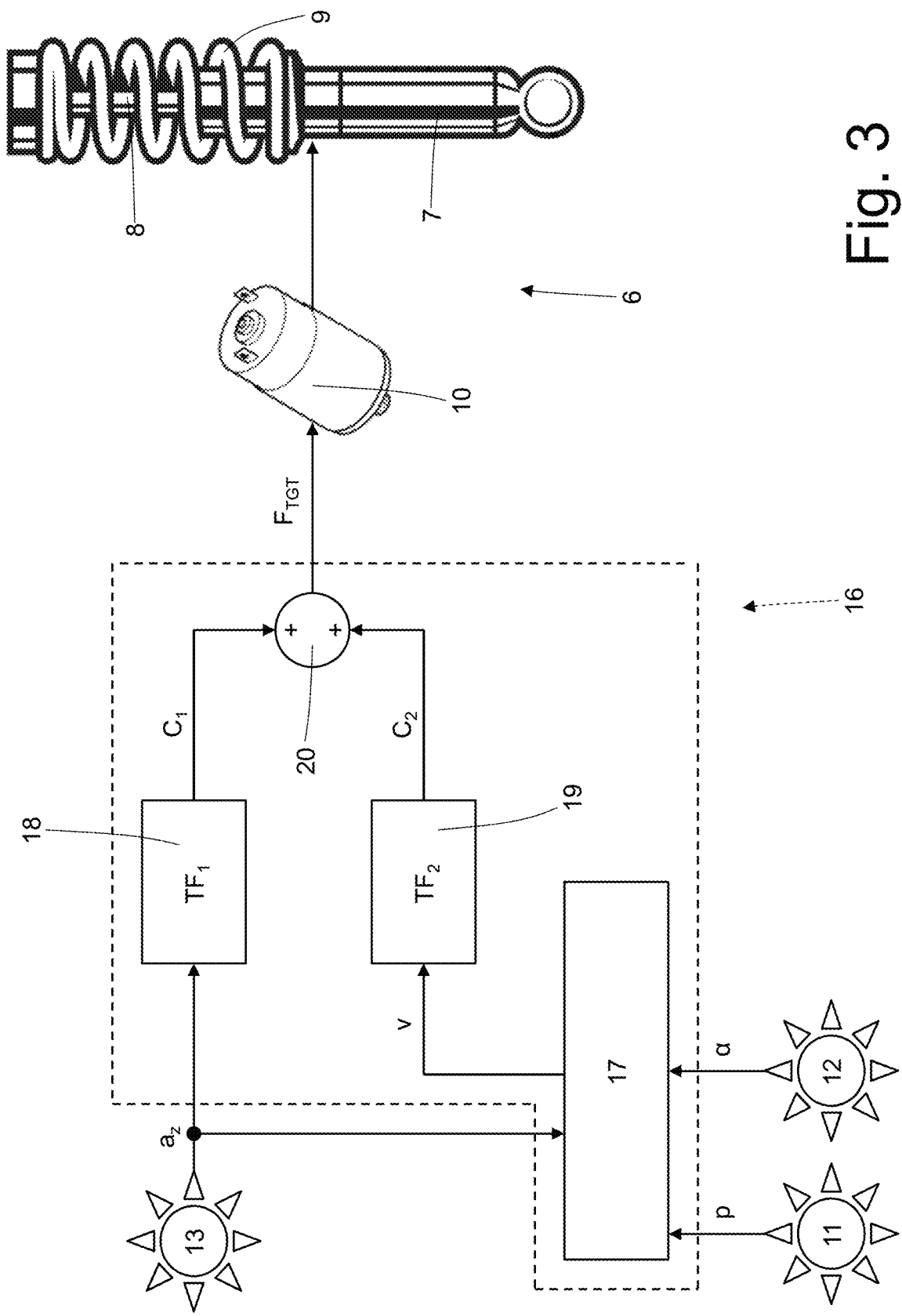
FIG. 3 is a control diagram implemented in a control unit of the road vehicle of FIG. 1.

According to FIG. 3, the control unit 16 implements an estimating block 17, which determines (estimates) a speed v of translation between the two elements 7 and 8 of the active shock absorber 6. According to a preferred embodiment, the estimating block 17 estimates the speed v of translation between the two elements 7 and 8 of the active shock absorber 6 based on a moving speed of the actuator 10 of the active shock absorber 6 (determined by deriving, in the time, the position p of the actuator 10 measured by the position sensor 12), based on the relative position p between the two elements 7 and 8 of the active shock absorber 6 (directly measured by the position sensor 11) and based on the vertical acceleration $a_z$ in the area of the hub 3 (directly measured by the vertical accelerometer 13).

According to FIG. 3, the control unit 16 implements a control block 18, which, by using an open-loop transfer function $TF_1$, determines a contribution $C_1$ exclusively based on the sole vertical acceleration $a_z$ in the area of the hub 3 (directly measured by the vertical accelerometer 13); in other words, the contribution $C_1$ exclusively depends on the sole vertical acceleration $a_z$ in the area of the hub 3. Furthermore, the control unit 16 implements a control block 19, which, by using an open-loop transfer function $TF_2$, determines a contribution $C_2$ exclusively based on the sole speed v of translation between the two elements 7 and 8 of the active shock absorber 6 (provided by the estimating block 17); in other words, the contribution $C_2$ exclusively depends on the sole speed v of translation between the two elements 7 and 8 of the active shock absorber 6. Finally, the control unit 16 implements an adder block 20, which calculates the target force $F_{TGT}$ of the actuator 10 by only and exclusively adding the two contributions $C_1$ and $C_2$ (it should be pointed out that the two contributions $C_1$ and $C_2$ also have a sign and, therefore, their sum is calculated taking into account the sign); namely, the value of the target force $F_{TGT}$ of the actuator 10 is exclusively determined by the sum of the sole contributions $C_1$ and $C_2$.

Basically, the open-loop transfer function $TF_2$ entails the force F generated by the actuator 10 (namely, the contribution $C_2$ of the target force $F_{TGT}$ of the actuator 10) being substantially proportional to the speed v of translation between the two elements 7 and 8 of the active shock absorber 6; namely, it increases as the speed v of translation between the two elements 7 and 8 of the active shock absorber 6 increases. Indeed, the gain of the transfer function $TF_2$ is measured in [Ns/m] as, by being multiplied by the speed v of translation (measured in [m/s]), it directly provides the contribution $C_2$ of the target force $F_{TGT}$ of the actuator 10 (measured in [N]).

In other words, the contribution $C_1$ is determined based on the sole vertical acceleration $a_z$ of the hub 3 and using the open-loop transfer function $TF_1$, which provides the contribution $C_1$ based on the vertical acceleration $a_z$; similarly, the contribution $C_2$ is determined based on the sole speed v of translation between the two elements 7 and 8 of the active shock absorber 6 and using the open-loop transfer function $TF_2$, which provides the contribution $C_2$ based on the speed v of translation. Hence, the control unit 16 determines the target force $F_{TGT}$ based on the vertical acceleration $a_z$ of the hub 3 and based on the speed v of translation between the two elements 7 and 8 of the active shock absorber 6 by exclusively using open-loop transfer functions $TF_1$ and $TF_2$.

Basically, the contribution $C_1$ determined based on the vertical acceleration $a_z$ constitutes an inertia compensation, whereas the contribution $C_2$ determined based on the speed v of translation between the two elements 7 and 8 of the active shock absorber 6 constitutes a damping compensation.

According to a preferred embodiment, the transfer functions $TF_1$ and $TF_2$ are variable as the frequency varies (generally, ranging from 0 to 50 Hz) and have a gain and a phase.

To sum up, the control unit 16 determines the target force $F_{TGT}$ for the actuator 10 of the active shock absorber 6 based on the vertical acceleration $a_z$ of the hub 3 (directly measured by the vertical accelerometer 13) and based on the speed v of translation between the two elements 7 and 8 of the active shock absorber 6 (provided by the estimating block 17). The control unit 16 controls the actuator 10 of the active shock absorber 6 so as to pursue the target force $F_{TGT}$; according to a preferred embodiment, the target force $F_{TGT}$ determined by the control unit 16 only and exclusively based on the vertical acceleration $a_z$ of the hub 3 and on the speed v of translation between the two elements 7 and 8 of the active shock absorber 6 could be added to other target forces determined in other ways and so as to pursue other targets (as described, for instance, in Italian patent applications 102021000015170 and 102021000015182).

Figure 4:
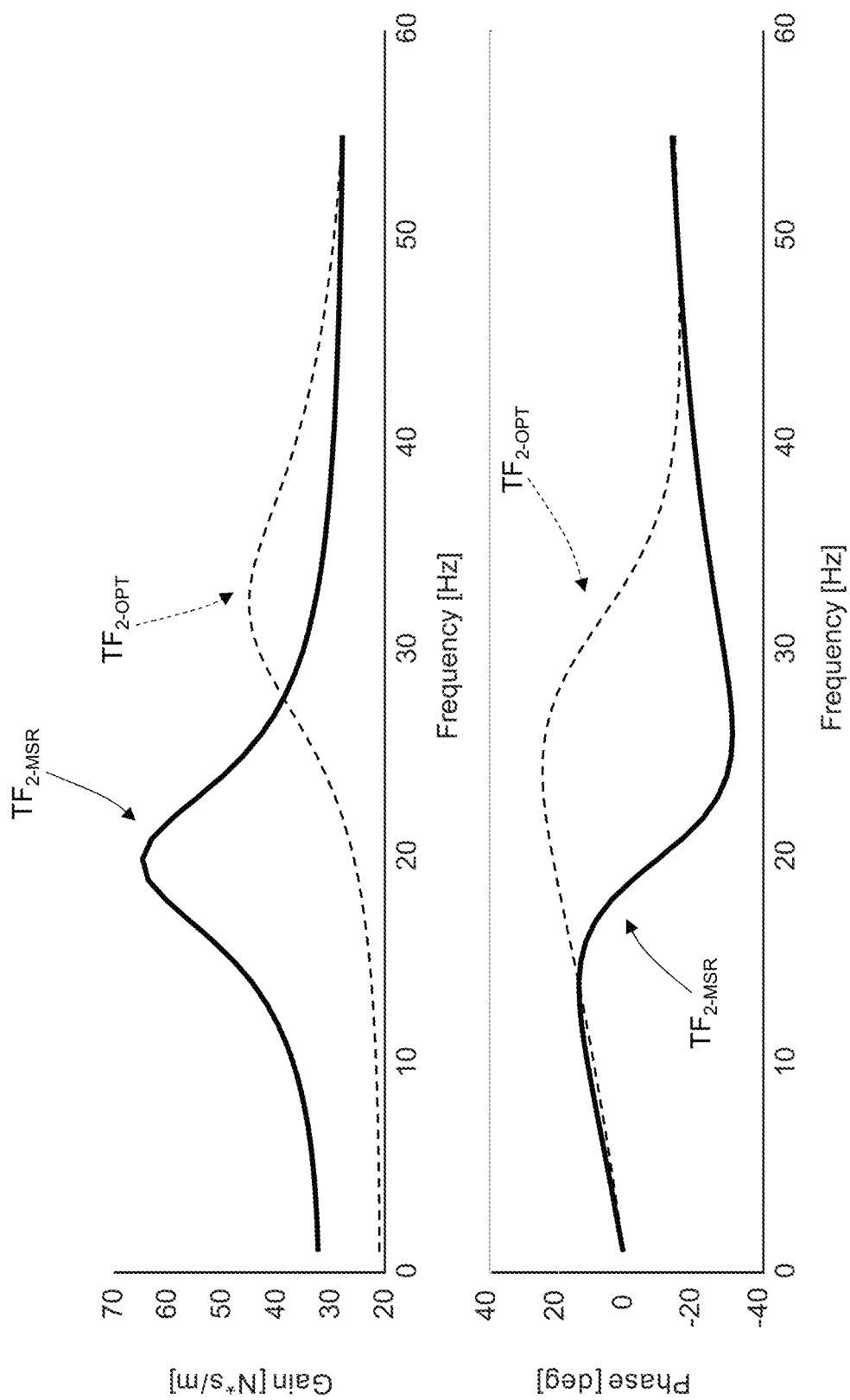
FIG. 4 is a diagram showing an optimal and desired transfer function and a corresponding measured transfer function.

According to a preferred embodiment, the transfer function TF2 consists of a map of experimentally determined points. In particular and according to FIG. 4, at first an optimal and desired transfer function $TF_{2\text{-}OPT}$ is established on paper in order to have an optimal and desired damping; subsequently, a measured transfer function $TF_{2\text{-}MSR}$ is experimentally determined by using mechanical stresses of the suspension 5 and by always keeping the second contribution $C_2$ at zero, namely by always having the target force $F_{TGT}$ coincide with the sole first contribution $C_1$. Finally, the transfer function $TF_2$ is determined as difference between the optimal and desired transfer function $TF_{2\text{-}OPT}$ and the measured transfer function $TF_{2\text{-}MSR}$.

The embodiments described herein can be combined with one another, without for this reason going beyond the scope of protection of the invention.

The control method described above has different advantages.

First of all, the control method disclosed above optimizes the damping response of the active shock absorber 6 (both in terms of effectiveness of the response and in terms of promptness of the response), though maintaining a hood level of comfort.

Furthermore, the control method disclosed above is particularly stable and safe as, by operating in open loop, it never risks triggering undesired oscillations.

Finally, the control method described above is simple and economic to be implemented, for it does not require either a significant calculation ability or a large memory space.

LIST OF THE REFERENCE NUMBERS OF THE FIGURES 1 vehicle
2 wheels
3 hub
4 frame
5 suspension
6 active shock absorber 7 element
8 element
9 spring
10 electric actuator
11 position sensor
12 position sensor
13 vertical accelerometer
14 longitudinal accelerometer
15 transverse accelerometer
16 control unit
17 estimating block
18 control block
19 control block
20 adder block
$a_z$ vertical acceleration
$\alpha$ angular position
p angular position
F force
$F_{TGT}$ desired force
$TF_1$ transfer function
$TF_2$ transfer function
$TF_{2\text{-}OPT}$ optimal transfer function
$TF_{2\text{-}MSR}$ measured transfer function
$C_1$ contribution
$C_2$ contribution

The invention claimed is:

1. A method to control a road vehicle (1) comprising:
a frame (4);
at least one wheel (2) provided with a hub (3); and
a suspension (5), which connects the frame (4) to the hub (3) of the wheel (2) and is provided with an active shock absorber (6) comprising: a first element (7), which defines an end of the active shock absorber (6), a second element (8), which defines another end of the active shock absorber (6) and is mounted so as to slide relative to the first element (7); and an actuator (10), which is configured to generate a force (F), which is applied between the two elements (7, 8);
the control method comprises the steps of:
determining a vertical acceleration ($a_z$) of the hub (3);
determining a speed (v) of translation between the two elements (7, 8) of the active shock absorber (6);
determining a target force ($F_{TGT}$) for the actuator (10) of the active shock absorber (6) based on the vertical acceleration ($a_z$) of the hub (3) and on the speed (v) of translation between the two elements (7, 8) of the active shock absorber (6);
controlling the actuator (10) of the active shock absorber (6) so as to pursue the target force ($F_{TGT}$);
determining a first contribution ($C_1$) exclusively based solely on the vertical acceleration ($a_z$) of the hub (3) and using a first open-loop transfer function ($TF_1$), which provides the first contribution ($C_1$) exclusively as a function of solely the vertical acceleration ($a_z$);
determining a second contribution ($C_2$) exclusively based solely on the speed (v) of translation between the two elements (7, 8) of the active shock absorber (6) and using a second open-loop transfer function ($TF_2$), which provides the second contribution ($C_2$) exclusively as a function of solely the translation speed (v); and
calculating the target force (FTGT) by adding the two contributions ($C_1$, $C_2$),
wherein the target force ($F_{TGT}$) is calculated by only and exclusively adding the two contributions ($C_1$, $C_2$).

2. The control method according to claim 1, wherein the second open-loop transfer function ($TF_2$) consists of a map of experimentally determined points.

3. The control method according to claim 1 and comprising the further step of:
determining the second open-loop transfer function ($TF_2$) as a difference between a second optimal and desired transfer function ($TF_{2\text{-}OPT}$) and a second measured transfer function ($TF_{2\text{-}MSR}$) determined by using mechanical stresses of the suspension (5), by always keeping the second contribution ($C_2$) at zero, and by always having the target force ($F_{TGT}$) coincide with the sole first contribution ($C_1$).

4. The control method according to claim 1, wherein the second open-loop transfer function ($TF_2$) is variable as frequency varies.

5. The control method according to claim 1, wherein the second open-loop transfer function ($TF_2$) has a gain having [Ns/m] as unit of measurement and a phase expressed in degrees.

6. The control method according to claim 1, wherein the second open-loop transfer function ($TF_2$) entails the second contribution ($C_2$) being proportional to the speed (v) of translation between the two elements (7, 8) of the active shock absorber (6).

7. The control method according to claim 1, wherein the second open-loop transfer function ($TF_2$) entails the second contribution ($C_2$) increasing as the speed (v) of translation between the two elements (7, 8) of the active shock absorber (6) increases.

8. The control method according to claim 1, wherein the first transfer function ($TF_1$) is variable as frequency varies.

9. The control method according to claim 1, wherein the active shock absorber (6) comprises a spring (9), which is connected between the two elements (7, 8) and is compressed or expanded when the two elements (7, 8) linearly translate relative to one another.

10. A method to control a road vehicle (1) comprising:
a frame (4);
at least one wheel (2) provided with a hub (3); and
a suspension (5), which connects the frame (4) to the hub (3) of the wheel (2) and is provided with an active shock absorber (6) comprising: a first element (7), which defines an end of the active shock absorber (6), a second element (8), which defines another end of the active shock absorber (6) and is mounted so as to slide relative to the first element (7); and an actuator (10), which is configured to generate a force (F), which is applied between the two elements (7, 8);
the control method comprises the steps of:
determining a vertical acceleration ($a_z$) of the hub (3);
determining a speed (v) of translation between the two elements (7, 8) of the active shock absorber (6);
determining a target force ($F_{TGT}$) for the actuator (10) of the active shock absorber (6) based on the vertical acceleration ($a_z$) of the hub (3) and on the speed (v) of translation between the two elements (7, 8) of the active shock absorber (6);
controlling the actuator (10) of the active shock absorber (6) so as to pursue the target force ($F_{TGT}$);
determining a first contribution ($C_1$) exclusively based solely on the vertical acceleration ($a_z$) of the hub (3) and using a first open-loop transfer function ($TF_1$), which provides the first contribution ($C_1$) exclusively as a function of solely the vertical acceleration ($a_z$);
determining a second contribution ($C_2$) exclusively based solely on the speed (v) of translation between the two elements (7, 8) of the active shock absorber (6) and using a second open-loop transfer function ($TF_2$), which provides the second contribution ($C_2$) exclusively as a function of solely the translation speed (v);

calculating the target force ($F_{TGT}$) by adding the two contributions ($C_1$, $C_2$); and determining the second open-loop transfer function ($TF_2$) as a difference between a second optimal and desired transfer function ($TF_{2\text{-}OPT}$) and a second measured transfer function ($TF_{2\text{-}MSR}$) determined by using mechanical stresses of the suspension (5), by always keeping the second contribution ($C_2$) at zero, and by always having the target force ($F_{TGT}$) coincide with the sole first contribution ($C_1$).

11. The control method according to claim 10, wherein the second transfer function ($TF_2$) is variable as frequency varies.

12. The control method according to claim 10, wherein the second transfer function ($TF_2$) has a gain having [Ns/m] as unit of measurement and a phase expressed in degrees.

13. The control method according to claim 10, wherein the second open-loop transfer function ($TF_2$) entails the second contribution ($C_2$) being proportional to the speed (v) of translation between the two elements (7, 8) of the active shock absorber (6).

14. The control method according to claim 10, wherein the second open-loop transfer function ($TF_2$) entails the second contribution ($C_2$) increasing as the speed (v) of translation between the two elements (7, 8) of the active shock absorber (6) increases.

15. The control method according to claim 10, wherein the first transfer function ($TF_1$) is variable as frequency varies.

* * * * *